Aug. 31, 1943. J. H. SULZER 2,328,107

ELECTRICAL CONNECTING AND CONDITIONING APPARATUS

Original Filed April 9, 1940  2 Sheets-Sheet 1

INVENTOR
J. H. SULZER
BY
E.R. Nowlan
ATTORNEY

Aug. 31, 1943.                J. H. SULZER                2,328,107
            ELECTRICAL CONNECTING AND CONDITIONING APPARATUS
              Original Filed April 9, 1940    2 Sheets-Sheet 2
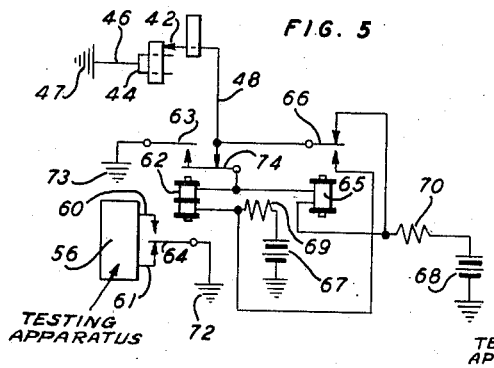
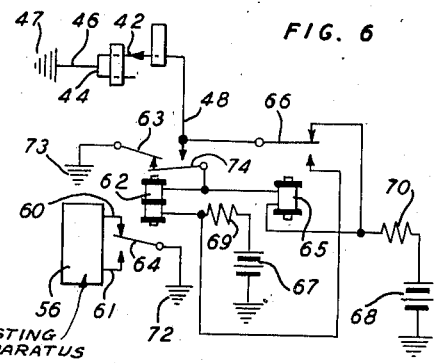
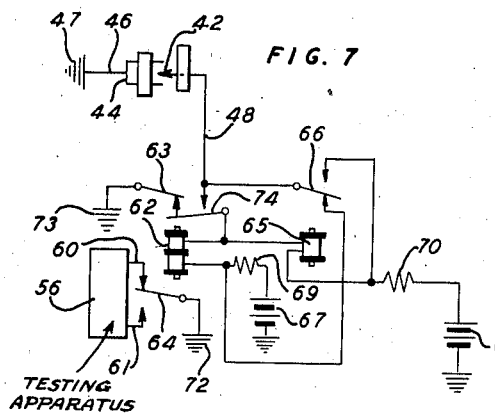
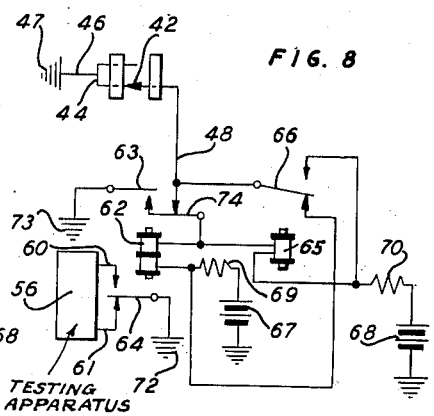
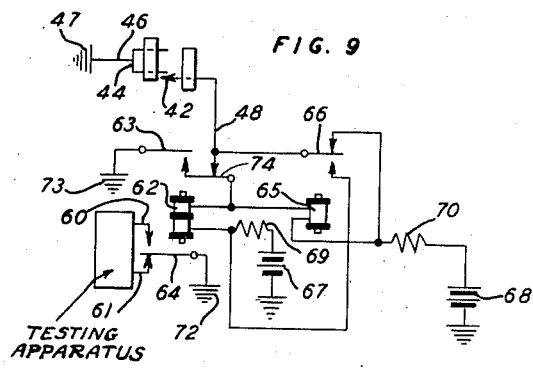
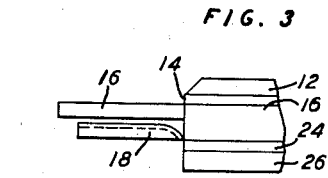
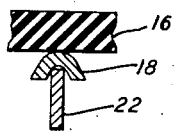
INVENTOR
J. H. SULZER
BY
E. R. Nowlan
ATTORNEY Patented Aug. 31, 1943

2,328,107

UNITED STATES PATENT OFFICE 2,328,107

ELECTRICAL CONNECTING AND CONDITIONING APPARATUS

John H. Sulzer, Westfield, N. J., assignor to Western Electric Company, Incorporated, New York, N. Y., a corporation of New York Original application April 9, 1940, Serial No. 328,644. Divided and this application September 28, 1940, Serial No. 358,812

1 Claim. (Cl. 175—183)

This application is a division of my copending application Serial No. 328,644, filed April 9, 1940, for Electrical connecting and conditioning apparatus.

This invention relates to electrical connecting and conditioning apparatus, and more particularly to the type used in testing electrical apparatus.

In testing electrical circuits and units of electrical structures the problem, of constructing a test set capable of performing the desired tests and also means to readily connect the electrical circuits or units that are to be tested thereto, arise. The number of electrical circuits or units in each structure to be tested determines the complexity of the problem. For example, when an electrical structure contains several electrical circuits and units to be tested separately and in definite order, this necessarily complicates the testing set and requires the connecting means to be of a structure capable of accurately connecting various circuits and units to the proper testing equipment of the apparatus. The time and effort required for an operator to make and break these various connections are greatly reduced when it is possible to make all connections simultaneously and break them all simultaneously. It has also been found advantageous in reducing the required efforts of an operator and also the time required to complete the test, if the testing apparatus can be controlled through the said connecting means.

An object of the invention is to provide an electrical connecting and conditioning apparatus which is simple in construction and capable of accurately making and breaking electrical connections of structures to be tested with electrical testing apparatus.

With this and other objects in view, the invention comprises an apparatus having opposing spring controlled members with rows of grooved contacts for engaging rows of terminals of electrical circuits or units to be tested and form definite electrical connections of the circuits or units with a test set, the invention also including a circuit affected during the natural action of the apparatus to control a starting and resetting circuit of the test set.

Other objects and advantages will be apparent from the following detailed description when taken in conjunction with the accompanying drawings, wherein Fig. 1 is a top plan view of the apparatus shown connected to an electrical structure to be tested, with portions of the apparatus broken away to illustrate certain details thereof;

Fig. 3 is a fragmentary detailed portion of the apparatus;

Fig. 4 is a fragmentary sectional view taken substantially along the line 4—4 of Fig. 2, and Figs. 5, 6, 7, 8 and 9 are wiring diagrams illustrating the starting and resetting circuit during the various positions of the switch of the apparatus.

Figure 1:
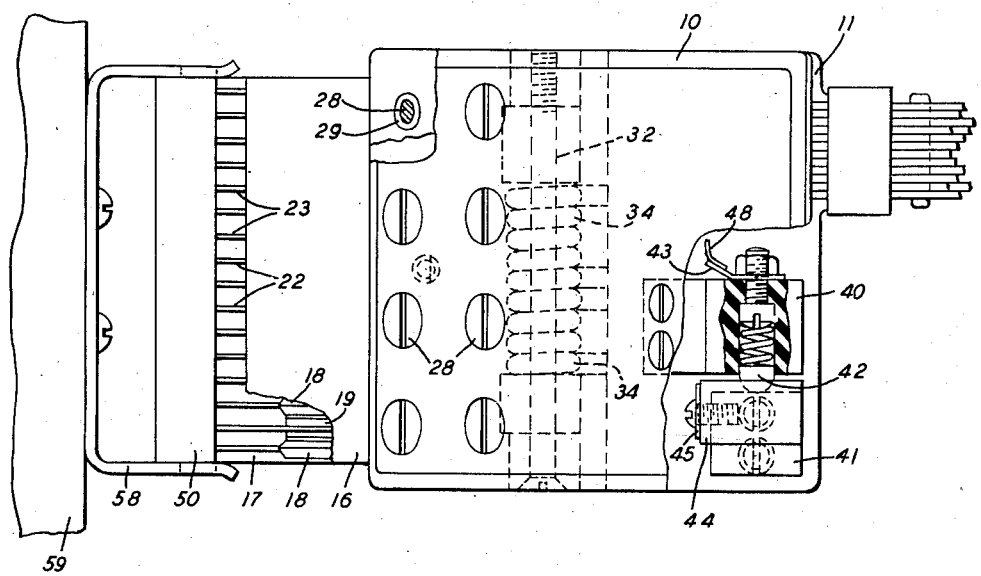
Figure 2:
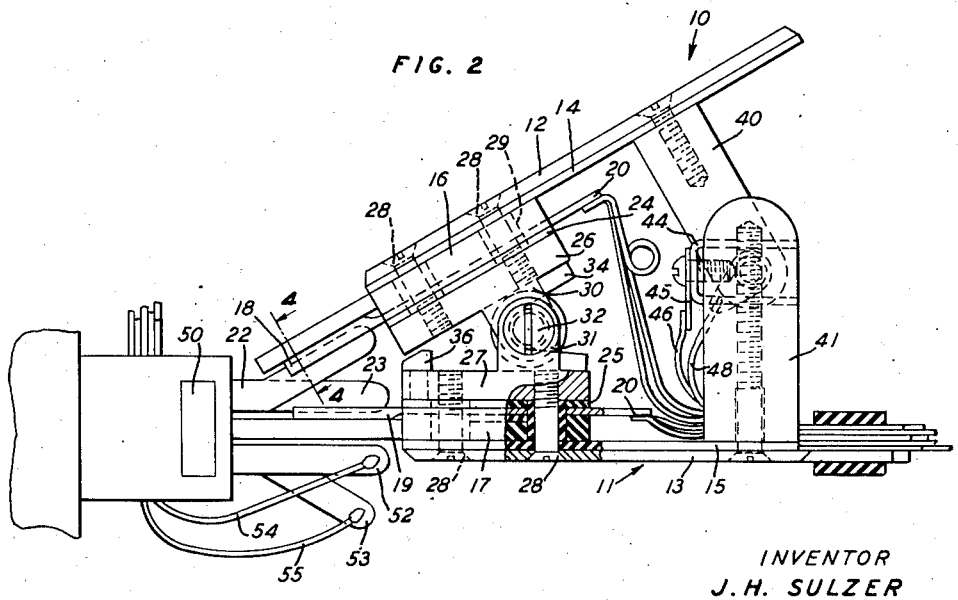
Fig. 2 is a side elevational view of the structure shown in Fig. 1.

Attention is now directed to Figs. 1 to 4 inclusive of the drawings, wherein opposing spring controlled portions are indicated generally at 10 and 11. These portions consist of outer plate members 12 and 13, respectively, having insulating members 14 and 15 disposed adjacent their inner surfaces and fixed thereto. Upon the insulating members 14 and 15 are disposed insulating strips 16 and 17, respectively, which extend forwardly of their respective plates 12 and 13 distances illustrated in Fig. 2 and extend laterally distances illustrated in Fig. 1, which are just short of the full width of the plates 12 and 13 for the portions extending beyond the plates and for the full width of the plates at the portions disposed adjacent thereto. A plurality of resilient contacts 18 and 19 is disposed adjacent their respective insulating strips 16 and 17. These contacts are all identical in construction and are formed of suitable material, such as phosphor-bronze. Extending from the inner ends 20 of the contacts (Fig. 2) to positions slightly beyond the forward edges of the plates 12 and 13, the contacts are flat but from the last mentioned points forwardly the contacts are formed V-shaped in cross section as illustrated in Fig. 4. These V-shaped portions of the contacts are normally spaced from their respective insulating strips 16 and 17 as illustrated in Fig. 3, and the flat portions between the V-shaped portions and the forward edges are sufficiently resilient to normally position the contacts from the insulating strips and allow these portions to be forced against the insulating strips while the apparatus is in use. In the present instance there are eight contacts carried by each opposing portion 10 and 11, the contacts on one being positioned in staggered relation with those of the other so as to electrically engage staggered rows of equally spaced terminals 22 and 23, respectively. The insulating strips 16 and 17 are grooved to equally space the contacts 18 and 19. Other insulating strips 24 and 25 are disposed adjacent their respective contacts and insulating strips as shown in Fig. 2.

Pivotal supports 26 and 27 extend the full width of their respective plates 12 and 13 and are joined thereto and to the insulating strips and insulating members by suitable means, such as screws 28, extending through suitable bushings 29 between certain of the contacts and threadly disposed in apertures in the pivotal supports. The supports 26 and 27 have outwardly projecting lugs 30 and 31, respectively, at spaced positions and with axially aligned apertures for receiving a pivot screw 32 passing through the apertures in the lugs including a threaded aperture in one of the end lugs. A pair of springs 34 disposed concentric with the pivot screw 32 and having the ends thereof engaging the rearward portions of the supports normally urges the supports 26 and 27 counterclockwise and clockwise, respectively, to positions controlled by a stop 36 carried by the support 27 and positioned to be engaged by the support 26. Switch supporting members 40 and 41, formed of suitable dielectric material, are respectively secured to the plates 12 and 13 adjacent one side thereof, as shown in Fig. 1, and extend at right angles with respect thereto so that the inner ends thereof may move adjacent each other.

A spring pressed switch member 42 is disposed in the supporting member 40 in electrical engagement with a terminal 43. A U-shaped switch member 44 is mounted on the support 41 and carries a terminal 45. The shape of the switch member 44 is such that it provides spaced engaging portions for the switch member 42, as illustrated in Fig. 2. A conductor 46 extends from the terminal 45 of the switch member 44 to a ground 47, illustrated in Figs. 5 to 9 inclusive, while a conductor 48 extends from the terminal 43 to the main portion of the control circuit illustrated in these figures.

In the present embodiment the electrical structure to be tested is a portion of telephone apparatus including a terminal strip 50 having the terminals 22 and 23 which are to be connected to other electrical circuits of telephone apparatus when installed and are electrically connected to or are a part of other electrical terminals 52 and 53, respectively. The last mentioned terminals are electrically connected through conductors 54 and 55, respectively, to electrical circuits and units of the structure to be tested and to be electrically connected to the desired testing circuits of an electrical testing apparatus 56 controlled by the electrical circuits shown in Figs. 5 to 9 inclusive. The terminal strip 50 is removably supported by a bracket 58 mounted upon a frame 59 of the electrical structure to be tested. It will be observed, by viewing Figs. 1 and 2, that the insulating strip 17 cooperates with the bracket 58 to guide the contacts 18 and 19 in aligned positions with respect to their terminals.

The electrical testing apparatus 56 which is controlled by the circuit shown in Figs. 5 to 9 inclusive is disclosed in my copending application Serial No. 438,930, filed April 14, 1942. There are two circuits of interest present in the testing apparatus, namely a starting circuit 60 and a resetting circuit 61. The starting circuit when closed energizes suitable means to cause the apparatus to function and perform various tests in predetermined sequence on the electrical structure through the electrical connections completed by the aid of the apparatus. The resetting circuit 61 energizes certain mechanism in the test set to return mechanism of the apparatus to a starting position so that another electrical apparatus may be tested.

The control circuit includes a double relay 62 for actuating contacts 63 and 64 and a single relay 65 for controlling a contact 66. The relays 62 and 65 are supplied with electrical energy from suitable sources such as grounded batteries 67 and 68, respectively, these electrical energies passing through suitable resistances 69 and 70, respectively. Fig. 5 illustrates the condition of the control circuit when the apparatus is not connected to the terminals of the terminal strip. When the apparatus is free of the terminals of the terminal strip the springs 34 cause the opposing members 10 and 11 to be moved to their farthest position controlled by the stop 36, at which time the switch 42 will be disposed above the upper portion of the switch member 44 as illustrated schematically in Fig. 5. When in this position the switch members 42 and 44 are out of engagement with each other and the circuits from the grounded batteries 67 and 68 through their respective relays 62 and 65 are open. In order to connect the apparatus to the terminals of the terminal strip the opposing members 10 and 11 of the apparatus must be moved about their pivot screw 32 a sufficient distance for the contacts 18 and 19 to receive the terminals and during this movement the switch members 42 and 44 vary their positions from that shown in Fig. 5 to that shown in Fig. 6 and then to that shown in Fig. 7, that shown in Fig. 8, that shown in Fig. 9, and finally back to that position shown in Fig. 7. In other words, the switch member 42 moves from a position above the switch member 44 shown in Fig. 5 into engagement with the upper portion of the switch member 44 (Fig. 6) between the portions of the switch member 44 (Fig. 7) in engagement with the lower portion of the switch member 44 (Fig. 8) out of engagement with and beneath the lower portion of the switch member 44 (Fig. 9) and when the opposing portions of the apparatus are allowed to be moved by the springs into gripping engagement with the terminals of the terminal strip the switch member 42 will be moved into engagement with the lower portion of the switch member 44 (Fig. 8) and come to rest between the portions of the switch member 44 (Fig. 7). This natural action of the opposing portions 10 and 11 of the apparatus which is necessary in order to move the contacts 18 and 19 in electrical engagement with the terminals 22 and 23 and thus electrically connect the electrical circuits and units of the structure to be tested, affects certain circuits, that is, the starting circuit 60 and the resetting circuit 61 of the test set, so that the test set is rendered effective the moment the apparatus is disposed in place without the necessity of further efforts on the part of the operator.

In Fig. 5 the resetting circuit 61 is completed through the contact 64 to ground 72. When the apparatus is being moved into open position the switch member 42 will first engage the upper portion of the switch member 44, completing the circuit, as shown in Fig. 6, from the grounded battery 67 through the relay 62, moving the contact 63, which is grounded at 73, into engagement with a contact 74 to complete another grounded circuit for the grounded battery 67 before the contact 74 is opened through the switch members 42 and 44 to the ground 47. Energization of the relay 62 also moves the contact 64 to open the resetting circuit 61 and close the starting circuit 60. At this time the relay 65 is prevented from operating by the grounded shunt across its winding from the grounded battery 68 through contact 66 in the upper position and through the switch members 42 and 44 to ground 47.

The next position of the apparatus illustrated in Fig. 7 moves the switch member 42 free of the switch member 44, opening the shunt circuit around the winding of the relay 65 and allowing the relay to be energized from the grounded battery 68 through the contacts 74 and 63 to ground 73. At this position the relay 62 remains energized.

At the next position shown in Fig. 8 the switch member 42 engages the lower portion of the switch member 44, providing a grounded shunt across the winding of the relay 62 from the grounded battery 67 through the contact 66 in the lower position held thereby during the energization of the relay 65 and through the switch members 42 and 44 to ground 47. The relay 62 will thus be deenergized, releasing its control of the contacts 63 and 64, resulting in the opening of the starting circuit, closing of the resetting circuit and the provision of a new ground for the circuit controlling the relay 65, this circuit being traced from the grounded battery 68 through the winding of the relay contact 74, the switch members 42 and 44, to ground 47.

The next position of the apparatus shown in Fig. 9 will find the switch member 42 moved beyond the lower portion of the switch member 44, opening the circuit to the relay 65 which was established through the ground 47 at the position shown in Fig. 8. At this position the starting circuit is opened, the resetting circuit 61 is closed and the circuits to the relays 62 and 65 are opened. At this position, however, the apparatus is in its open position to be located relative to the terminals 22 and 23, and, during this time, that is, until the contacts 18 and 19 have been disposed adjacent their respective terminals and the apparatus released to bring them in intimate engagement with the terminals, the test set has had sufficient time to be reset. In releasing the apparatus the switch members 42 and 44 move from the position shown in Fig. 9 to the position shown in Fig. 8, where the relay 62 will be energized, as shown in Fig. 6, through the switch members 42 and 44 to ground 47, conditioning the control circuit for the energization of the relay 65 when the opposing members of the apparatus come to rest (Figs. 1, 2 and 7) with their contacts in intimate engagement with the terminals of the terminal strip and the switch member 42 positioned between and out of engagement with the portions of the switch member 44. The energization of the relay 62 at this position with the complete connections of the electrical structure to be tested have been made with the proper electrical circuits of the test set to open the resetting circuit and close the starting circuit so that the testing operation may begin.

In the operation of the apparatus it will be observed, by viewing Figs. 1 and 2, that the terminals 52 and 53 are electrically connected to electrical units 59 to be tested. Each terminal 52 is electrically connected to its respective terminal 22 and in the same manner each terminal 53 is electrically connected to its respective terminal 23. Therefore, when the contacts 18 and 19 of the apparatus are electrically connected to a test set it is possible to electrically connect each unit to be tested thereto by connecting the apparatus to the terminals 22 and 23 of the terminal strip. This is made possible by moving the opposing members 10 and 11 of the apparatus about their pivot 32 so as to move the contacts 18 and 19 away from each other a sufficient distance so that the insulating strip 17 and the contacts 19 may be inserted between the sets of terminals as shown in Fig. 2. The insulating strip, therefore, serves as a guide in passing between the sets of terminals, to properly position the contacts relative to their respective terminals. The operator may release the opposing members and in doing so the springs 34 will force the member 10 about the pivot 32 to move the contacts 18 into intimate engagement with their terminals 22 and to draw the contacts 19 into intimate engagement with their terminals 23. When this has been accomplished the electrical units to be tested are electrically connected to the test set. During this relative movement of the opposing members 10 and 11 the switch members 42 and 44 are moved relative to each other from the position shown in Fig. 5 and through the successive positions shown in Figs. 6, 7, 8, 9, 8 and 7. These switch members, therefore, control the two circuits of the test set 56, namely the starting circuit 60 and the resetting circuit 61. The switch members 42 and 44 are, therefore, constructed and arranged so that the necessary relative movement of the opposing members 10 and 11 will cause the control circuit to function through the cycle of operations illustrated in Figs. 5, 6, 7, 8, 9, 6 and 7, so that the operator need only position the apparatus in engagement with the terminals of the electrical units to be tested, and these units will be electrically connected to the test set and the test set will be conditioned to perform the tests.

Occasionally it has been found that due to the presence of oxidation on the terminals or other incidents which might arise, wherein a defect in one or more of the electrical units under test is registered on the test set, the operator may wish to repeat the test on the units. In any case, all the operator need do is actuate the apparatus, that is, cause movement of the member 10 relative to the member 11 and release the member 10 in an effort to get a more positive electrical connection between the contacts and the terminals to be sure that the lack of a good electrical connection at this point is not the cause of the defect being registered. The V-shape of the contacts 18 and 19 causes a wiping action on their terminals to assure positive connections. The suggested movement of the member 10 will move the switch members 42 and 44 first into the position shown in Fig. 8, which will provide a shunted path around the relay 62, deenergizing the relay to open the starting circuit 60 and close the resetting circuit 61. The test set will then be conditioned to renew the test on the units as soon as the member 10 is released, to again complete electrical connection with the terminals of the electrical units. Before the member 10 has been released it has been moved to move the switch members 42 and 44 to the position shown in Fig. 9. As the member 10 returns to its position shown in Figs. 2 and 7 it will first pass through the position indicated in Fig. 8, to condition the control circuit to open the resetting circuit 61 and close the starting circuit 60 when the switch members 42 and 44 arrive at the position shown in Fig. 7.

The embodiment of the invention herein disclosed is merely illustrative and may be modified and departed from in many ways without departing from the spirit and scope of the invention as pointed out in and limited solely by the appended claim.

What is claimed is:

The combination with a testing apparatus having a starting circuit and a resetting circuit to respectively start the apparatus to test an electrical unit and to reset the apparatus to condition it to test another electrical unit, of an electrical connecting and conditioning apparatus comprising a clamp having elements electrically connected to the testing apparatus and movable relative to each other from a normal substantially closed position to an open position and back to a clamping position to electrically connect an electrical unit to the testing apparatus, switch members mounted on the clamp for movement into and out of engagement with each other at definite relative positions of the elements during relative movement of the elements, a contact movable to alternately close the said circuits in a given order and to alternately open the said circuits in the reverse order, and a relay circuit, including a relay adapted to actuate the said contact, controlled by the switch members during their movements into and out of engagement with each other during their relative movements with the elements to cause the contact to close the resetting circuit when the elements have been moved into their normal position and open position and to cause the contacts to close the starting circuit when the elements have been moved into their clamping position.

JOHN H. SULZER.